Feb. 22, 1927.

C. A. HOXIE 1,618,757

SPEED REGULATOR

Filed Aug. 26, 1925

2 Sheets-Sheet 1

Inventor:
Charles A. Hoxie,
by *Alexander F. ~~~*
His Attorney.

Patented Feb. 22, 1927.

1,618,757

UNITED STATES PATENT OFFICE.

CHARLES A. HOXIE, OF SCHENECTADY, NEW YORK, ASSIGNOR TO GENERAL ELECTRIC COMPANY, A CORPORATION OF NEW YORK.

SPEED REGULATOR.

Application filed August 26, 1925. Serial No. 52,671.

My invention relates to speed regulators for rotating apparatus and although not limited thereto, it is particularly adapted for regulating the frequency of an alternating current distribution system in accordance with the rate of a master clock in order that secondary clocks connected to the system will indicate correctly. In any speed control system which depends for its regulation upon a master clock, it is of primary importance that no work be required from the master clock as this would tend to interfere with its time-keeping function. It is the main object of my invention to provide such a system. A further object of my invention is to provide a master clock regulator which will maintain the accuracy of secondary clocks controlled thereby within a fraction of a second.

A realization of both of these objects is accomplished according to my invention by the use of one or more photo-electric cells which are made responsive to very slight variations between the rate of the master clock and the rate of secondary apparatus controlled by the master clock. Preferably, use is made of what may be termed a frictionless differential window operating mechanism comprising a pair of shutters respectively operated at rates proportional to that of the clock or other rate setting device and that of the apparatus the speed of which is to be controlled for varying the transmission of light to the cell or cells in accordance with departures in the rates of the two shutters. Preferably, correcting current impulses produced by the photo-electric cell or cells are intensified by means of amplifiers and then caused to operate on a speed regulating device for the controlled system.

Figure 1:
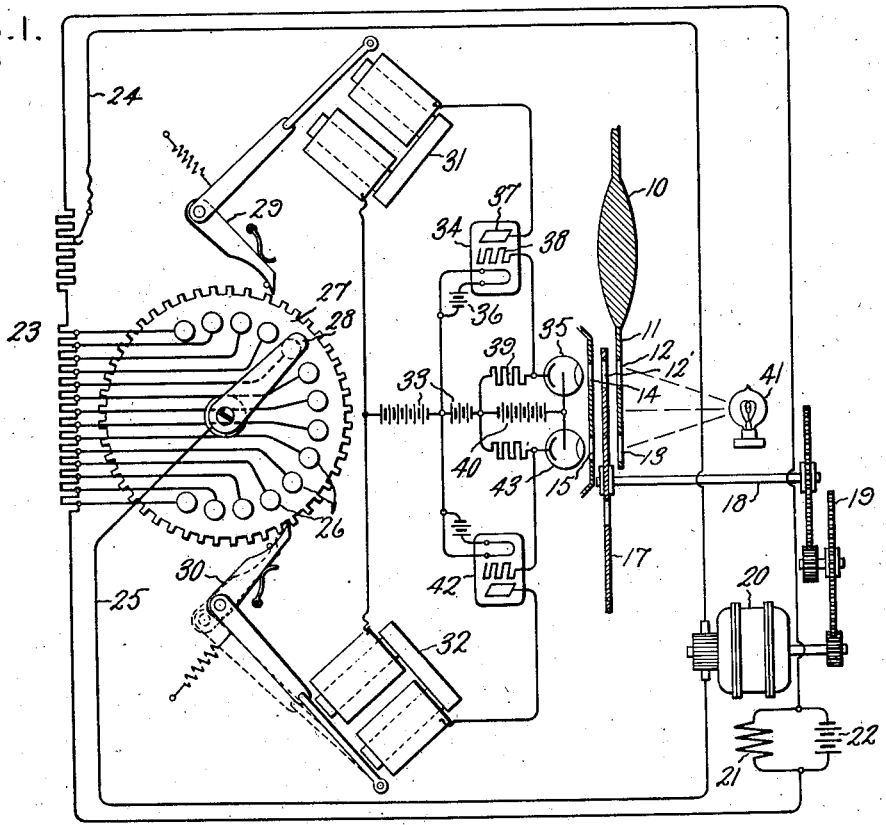
Figure 2:
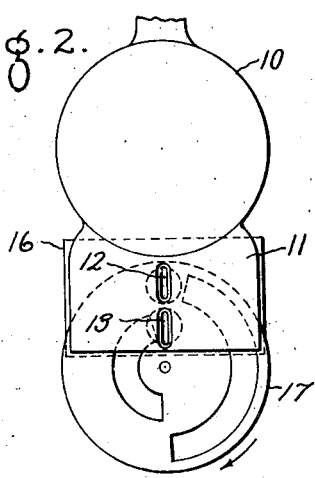
Figure 3:
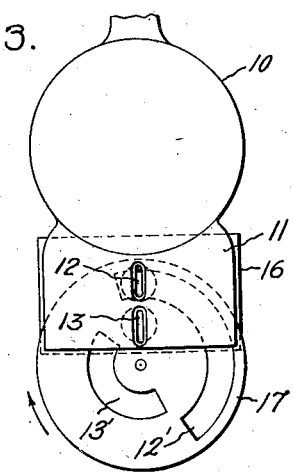
Figure 4:
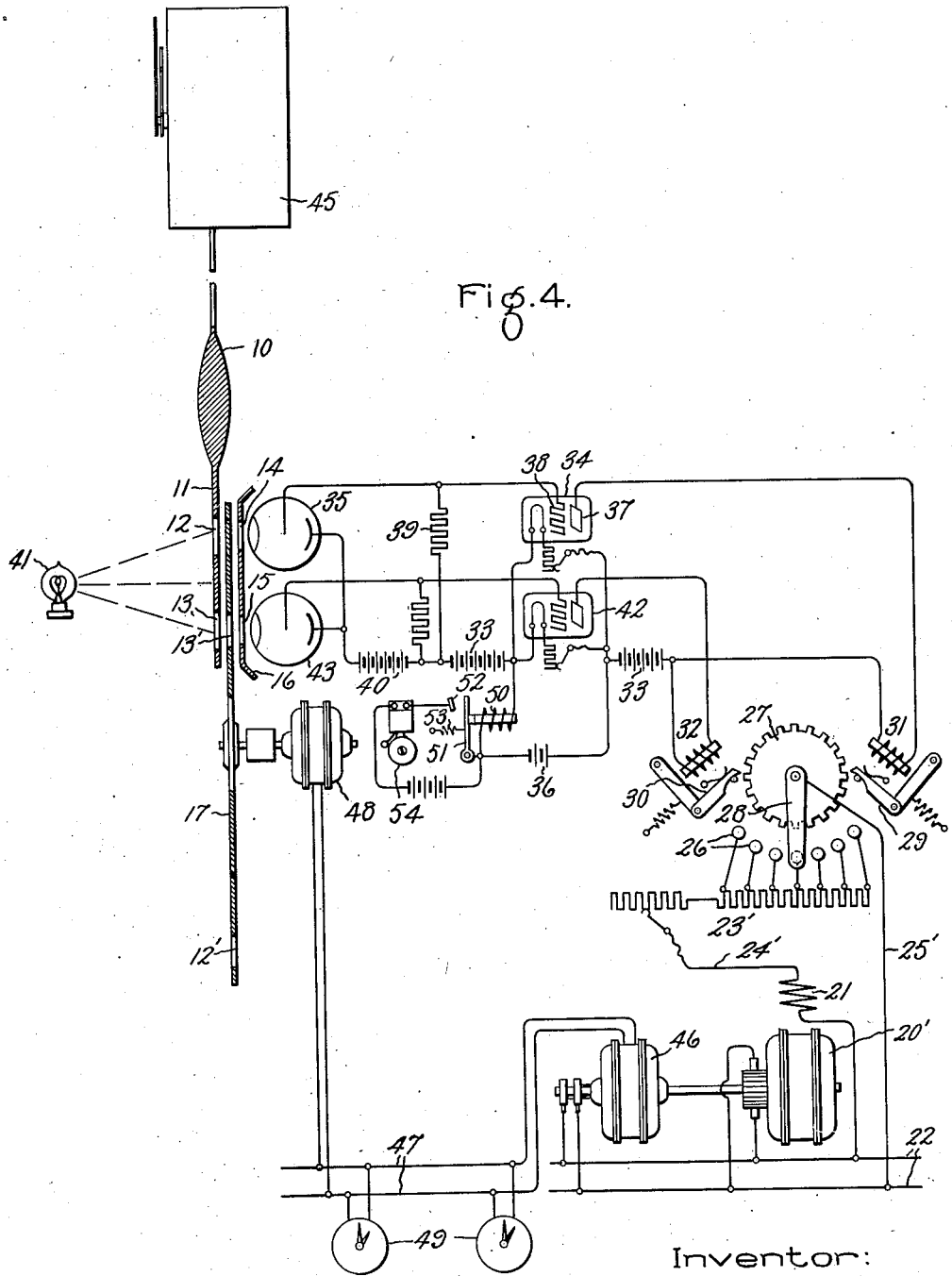

The features of my invention which are believed to be novel and patentable will be pointed out in the claims appended hereto. For a better understanding of my invention, reference is made in the following description to the accompanying drawings in which Fig. 1 represents the essential parts of my invention as used to control the speed of an electric motor in accordance with the rate of a pendulum; Figs. 2 and 3 represent different regulating positions of the pendulum and shutter mechanism which control the emission of light to the photo-electric cells; and Fig. 4 represents a master clock regulator embodying my invention as used to control the frequency of an alternating current distribution system from which secondary clocks are operated.

Referring now to Fig. 1, I have represented at 10 the lower portion of a pendulum which is provided beneath the pendulum bob with a shutter 11. The shutter is preferably slightly wider than the amplitude of the swing of the pendulum so that as the pendulum swings back and forth, the shutter does not pass completely past the center of the swing. The pendulum shutter is provided at its center with two vertical slits 12 and 13 one above the other which are in alinement with corresponding slits 14 and 15 in a stationary mask 16 not numbered in Fig. 1, when the pendulum is at the center of its swing. Between the stationary mask 16 and the pendulum shutter 11 is a rotary disc shutter 17 which is driven from shaft 18 through gearing 19 from the motor 20, the speed of which is to be controlled. The shutter 17 contains two sector shaped openings 12' and 13' not numbered in Fig. 1, extending nearly 180 degrees around the disc on opposite sides thereof and having different radiuses so that as the disc is rotated, opening 12' will pass in alinement with stationary opening 12 during one part of a revolution and opening 13' will pass in alinement with stationary opening 13 during another portion of a revolution.

In the present case the motor 20 is represented as of the direct current type having its field 21 connected across a direct current source represented as a battery 22. The armature circuit of the motor is connected across a variable portion of a resistance 23 connected across the battery 22. Armature lead 24 is manually adjustable along the upper portion of resistance 23 and armature lead 25 is adjustable along the lower portion of the resistance 23 by means of an automatic rheostat which is made responsive to very slight variations in the relative rates of the pendulum 10 and the motor operated shutter 17. The rheostat comprises stationary contacts 26 connected by taps to different points on the lower section of the resistance 23, a rotatable ratchet wheel 27, to which is secured the rheostat arm 28, ratchets 29 and 30 for rotating the wheel 27 in opposite directions of rotation and relays 31 and 32 for respectively operating the ratchets 29 and 30. Relay 31 is connected to a battery 33 through an amplifying tube 34 and the operation of the tube is controlled by a photoelectric cell 35 located in alinement with the upper opening 14 of the mask 16. The tube is of the vacuum type, preferably a pliotron tube, having a filament heated by a local battery 36 and connected to the proper point on the battery 33, a plate 37 connected to the relay 31 and a grid 38 connected through a resistance 39 to the source 33. The resistance 39 is also connected across a battery 40 in series with the photo-electric cell 35, as represented, so that when the cell becomes active due to the entrance of light rays from a suitable light source represented at 41, the potential of the grid 38 will be raised and allow current to flow through the plate circuit including relay 31 from the battery 33. Pliotron grids have a strong negative bias when no light enters the photo-electric cells so that no current flows in the plate circuit except when the rheostat is being operated. Relay 32 is controlled in a similar manner by a tube 42 and a photo-electric cell 43 when light rays are allowed to pass through the opening 15 in mask 16.

The manner in which the apparatus operates to control the speed of motor 20 will now be explained. It will be understood that the photo-electric cells are suitably enclosed so that the only light that can reach them must pass through the adjacent openings in mask 16, rotating shutter 17 and the pendulum shutter 11. These openings, or windows, may be closed by either the rotary shutter 17 or the pendulum shutter 11, or by both. The upper window is open when the pendulum is at the center of its swing and the opening 12' in the rotatable shutter 17 is uppermost in some such position as is represented in Figs. 1 and 3. The lower window is open when the pendulum is at the center of its swing and the opening 13' in the rotatable shutter 17 is uppermost and adjacent opening 15. At all other times these windows are closed. Thus, as represented in Fig. 2, the pendulum is at the center of its swing, but the rotatable shutter 17 is in the narrow range of its movement where neither openings 12' nor 13' are opposite the corresponding openings in the stationary mask 16. Suppose that pendulum 10 swings past the center position once per second: in this case, the gearing between the motor 20 and the rotatable disc shutter 17 will be such that the disc makes one revolution per second when the speed is correct and the relative movements of the disc 17 and the pendulum 10 will be such as represented in Fig. 2 so that so long as this correct speed is maintained, neither window is opened. This condition of affairs may be obtained by adjusting the motor speed by means of the manual adjustment of lead 24 along the upper part of resistance 23.

Now, suppose the motor speed decreases slightly and is revolving in the direction represented by the arrows in Figs. 2 and 3. This will bring opening 12' in disc 17 in alinement with opening 14 in the stationary mask at the instant the pendulum is at the center of its swing and will allow light rays to reach cell 35 from source 41 for an instant during each second so long as this condition exists. This will cause tube 34 to pass current impulses to relay 31 which will operate ratchet 29 and rotate rheostat arm 28 in a clockwise direction to cut out resistance in the armature circuit, thereby increasing the speed of the motor. The increase in motor speed brings the relative movements back to that represented in Fig. 2 perhaps with the motor operating slightly above normal speed. This will finally bring opening 13' in alinement with opening 15 at the instant the pendulum is at the center of its swing, thereby allowing light rays to reach cell 43 which in turn will cause tube 42 to send one or more current impulses through relay 32 to adjust the speed to a slightly lower value.

It will be evident that the speed adjustment takes places at the slightest variation in speed from normal and is such as to maintain the average speed of the motor correct. If the proper precaution is taken in selecting the apparatus and refinement of speed adjustment, the motor speed will not depart from the rate set by the pendulum more than about $\frac{1}{10}$ of a second either slow or fast. It is also seen that no interference whatever is made with the normal operation of the pendulum such as might tend to cause an error in its rate. While I have represented a pendulum as the rate setting device, I do not wish to be limited thereto since it will be evident that a rate setting shutter driven or operated by any other means and not necessarily at constant rate might be used.

In Fig. 4 I have represented the application of my invention for controlling the frequency of an alternating current distribution system from a master clock. The master clock is represented at 45 and has a pendulum operated shutter similar to that previously described. The parts which are similar to those previously described are represented by like reference numerals and need not be explained again. The direct current motor 20' is arranged to have its field current varied instead of its armature current and the apparatus will be arranged to decrease the resistance 23' to increase the speed of the motor and vice versa. The motor 20' drives a sychronous generator 46, the alternating current terminals of which supply the distribution system 47. Instead of having a direct mechanical connection between the motor 20' and rotatable shutter 17, the shutter is driven by a suitable synchronous motor 48 energized from the system 47. The shutter will then of course be operated at a speed proportional to that of motor 20'. Secondary clocks are represented at 49 connected to the system 47 and these clocks will be maintained correct with the master clock 45 in the manner previously described.

Experience has shown that the various parts of the apparatus are very reliable and function uniformly over long periods of time. The only parts which are liable to give out are the filaments of the pliotron tubes. Such filaments may burn out after long service and in order that this may be detected and corrected, I prefer to provide a relay 50 in the heating circuit of the filaments. This relay is set so that the normal heating current of both filaments supplied by the battery 36 will hold the armature 51 away from a contact 52. However, if one or both filaments burn out, the strength of the relay current is decreased to a value where the spring 53 will pull the armature over against contact 52 and close the circuit of an alarm 54. During the time a tube is being replaced, the motor generator can be depended upon for supplying the system without any serious departure from the correct frequency which will allow the control circuit to be repaired and again closed without any interruption of service. If, however, by reference to the secondary clocks, it is found that a few seconds has been lost or gained during the time the control circuit was out of commission, it may be easily corrected by the hand control rheostat, after which it can be left to the automatic control.

The motor 20 has been illustrated and described as an electric motor, but it will be obvious that other types of motors might be used and the control apparatus used to regulate the motive fluid thereto so as to maintain the speed of the motor constant or proportional to the rate of the rate setting shutter.

In accordance with the provisions of the patent statutes, I have described the principles of operation of my invention, together with the apparatus which I now consider to represent the best embodiment thereof; but I desire to have it understood that the apparatus shown and described is only illustrative and that the invention may be carried out by other means.

What I claim as new and desire to secure by Letters Patent of the United States, is:

1. In a speed control system for rotatable apparatus comprising a light sensitive cell, a source of light, a pair of movable shutters between said light source and cell, means for moving said shutters relative to each other in accordance with a departure in the speed of said rotating apparatus from a desired speed so as to transfer light from said source to said cell in proportion to such departure, and means controlled by said cell for correcting said speed.

2. In a speed control system comprising rotatable apparatus the speed of which is to be controlled, a light sensitive cell, a source of light, a movable rate setting shutter and a shutter operated in synchronism with said rotatable apparatus between said cell and light source arranged to control the transmission of light to said cell in accordance with relative variations in the rates of said shutters, and means controlled by said cell for controlling the speed of said rotatable apparatus.

3. In a speed control system, rotatable apparatus, a clock and means controlled by said clock for controlling the speed of said rotatable apparatus, comprising a light sensitive cell, a light source, a pair of shutters movable between said light source and cell for controlling the transmission of light to said cell, one of said shutters being moved by said clock and the other being moved at a rate proportional to the speed of said rotating apparatus, and speed regulating apparatus for said rotatable apparatus controlled by said cell.

4. In a speed control system, a rate setting device and rotatable apparatus to be controlled, a pair of shutters respectively operated at rates proportional to the rates of said device and apparatus, a light sensitive cell, said shutters comprising a frictionless differential window operating mechanism for controlling the transmission of light to said cell in accordance with departures in the rates of said shutter, and means controlled by said cell for controlling the speed of said rotatable apparatus.

5. A speed control system comprising a rate setting device, rotatable apparatus to be controlled, a pair of light sensitive cells, a source of light, a pair of shutters, respectively operated at rates proportional to the rates of the rate setting device and the rotatable apparatus, located between said cells and light source arranged to control the transmission of light to one of said cells in accordance with a positive error in the speed of said rotatable apparatus and to control the transmission of light to the other cell in accordance with a negative error in the speed of said rotatable apparatus, and means controlled by said cells for correcting said errors.

6. A speed control system comprising rotatable apparatus, a pendulum clock, a pair of light sensitive cells, a source of light, a shutter on said pendulum between said light source and cells arranged to intercept the transmission of light to said cells except when the pendulum is at the center of its swing, a rotatable shutter driven at a speed proportional to that of the rotatable apparatus also located between said light source cells and arranged to alternately intercept the transmission of light to said cells during a part of each revolution and to intercept the transmission of light to both cells during the remaining portion of each revolution, means controlled by one of said cells for increasing the speed of said rotatable apparatus, and means controlled by the other cell for decreasing the speed of said rotatable apparatus.

7. A speed control system comprising a motor, a pendulum clock for controlling the speed of said motor, a pair of light sensitive cells, a source of light, a frictionless differential window operating mechanism located between said light source and cells having shutters operated in accordance with the rates of said clock and said motor respectively and arranged to intercept the transmission of light to said cells except when the average speed of the motor is slow or fast with respect to the rate of the clock pendulum and to transmit light to one cell when the average motor speed is fast and to the other cell when the average motor speed is slow, and means controlled by said cells for correcting the average speed of said motor.

In witness whereof, I have hereunto set my hand this 11th day of August, 1925.

CHARLES A. HOXIE.